US005172097A

United States Patent [19]

Arnold

[11] Patent Number: 5,172,097

[45] Date of Patent: Dec. 15, 1992

[54] SECURITY BOX FOR MOUNTING AGAINST A WALL AND FOR HOLDING KEYS

[76] Inventor: Bradley J. Arnold, 2528 S. 69th St., Milwaukee, Wis. 53219

[21] Appl. No.: 844,861

[22] Filed: Mar. 2, 1992

Related U.S. Application Data

[63] Continuation-in-part of Ser. No. 660,199, Feb. 25, 1991, abandoned.

[51] Int. Cl.[5] .......... B60C 23/00

[52] U.S. Cl. .......... 340/543; 340/545; 70/DIG. 49

[58] Field of Search .......... 340/542, 543, 545, 568; 70/54, 63, 159, DIG. 49; 109/38, 44, 78, 85; 292/104, 205

[56] References Cited

U.S. PATENT DOCUMENTS

| | | | |
|---|---|---|---|
| 752,396 | 2/1904 | Johnson | 292/205 |
| 2,679,039 | 5/1954 | Koppl | 340/542 |
| 4,290,281 | 9/1981 | Knaack | 70/63 |
| 4,718,259 | 1/1988 | Appelbaum | 70/63 |
| 5,076,078 | 12/1991 | Weger, Jr. | 70/54 |

FOREIGN PATENT DOCUMENTS

| | | | |
|---|---|---|---|
| 2058196 | 4/1981 | United Kingdom | 70/56 |

*Primary Examiner*—Jin F. Ng
*Assistant Examiner*—Christine K. Oda
*Attorney, Agent, or Firm*—Wheeler Law Firm

[57] ABSTRACT

A security box for mounting against a wall and capable of holding keys and the like. The security box having a cover capable of being in alternatively open and closed positions and two switches for use with a standard electrical alarm circuit. The box containing at least one lock and a latch that has a cammed surface, for securing the cover of the box in the closed position in conjunction with the lock. The box further having a latch receiving structure, for receiving the latch when the cover of the box is in the closed position, that is integral to the box. The latch being attached to the cover of the box and having a spring for disengaging the latch from the closed position in conjunction with the lock. The latch being capable of actuating at least one of the two switches and the lid of the box being able to actuate the other switch when either the lock or the lid of the box is tampered with. The lock being positioned to contact the latching means so that the latching means actuates at least one of the switches.

6 Claims, 4 Drawing Sheets

SECURITY BOX FOR MOUNTING AGAINST A WALL AND FOR HOLDING KEYS

This application is a continuation-in-part of application no. 07/660,199 filed Feb. 25, 1991, now abandoned.

BACKGROUND OF THE INVENTION

The instant invention relates to a security box for securing small objects such as keys which allows ready access by authorized users, while allowing two methods of alarm actuation when tampered with.

The applicant knows of no prior art which teaches the unique features and designs of his invention. For example, U.S. Pat. No. 3,727,561 (Rey) discloses a release of a lock that is used on a pivoted arm of a safe. Upon unauthorized movement of the arm an alarm is sounded. The patent discloses a security safe that is placed in a pair of spaced pits located in the floor of a building. The first pit contains a security safe and has a removable cover. A concealed shaft extends from the first pit to a second pit and has a latch and lock arms secured to opposite ends thereof. The arms are simultaneously removable between the first and second pivot positions, and the lock arm is disposed in the second pit. The latch arm is disposed in the first pit and carries a latch means that is engagable with a mating latch means on the cover when the arms are in their first pivotal position. A releasable lock is used to secure the lock arm in its first pivotable position, and an alarm system is arranged to give an alarm upon unauthorized movement of either arm from their first pivotal position. This patent does not teach the switch arrangement or the structure of the instant invention.

U.S. Pat. No. 3,056,125 (Harry), discloses a safe and vault alarm device. Again, the structure of the Harry patent is different from the applicant's novel structure. Essentially, this patent discloses a device which will sound an alarm if the combination knob of the safe is moved. Harry also discloses the use of switches which could be used to complete a circuit depending upon the action taken. For example if the safe is picked up and tipped the mercury switches will cause the connection in the alarm to sound. If the safe dial is turned the contacts 40 and 44 will cause an alarm to sound. The relays disclosed by Harry are essentially solenoids which are powered by the use of dry cell batteries. The applicant's invention is structurally different from Harry in that it uses switches and mechanical means to activate those switches. Further, the applicant's means of activating the switches is different from that disclosed by Harry.

U.S. Pat. No. 2,923,928 (McLaughlin), discloses a combination lock protective system. Again, this patent, like the Harry patent will cause an alarm to sound if the combination knob is rotated. The alarm may be at a remote location. Specifically the device disclosed comprises a mechanical unit that is connected with a combination lock such as the dial of a safe. Rotation of the dial moves the lever arm which operates a circuit breaker or micro switch to control a green light through a relay to indicate a securely locked safe. When the safe is in a unlocked condition or if the tumblers have not been cleared by rotating the dial in one direction a number of turns after closing the door, a red light indicates that the safe is not secure. The lights can be connected with a remote indicator which will indicate whether or not all safes in a particular area are secure or in event the safes are tampered with as by a burglar, an alarm associated with the main office indicator will be sounded to give warning. However, McLaughlin does not disclose the structure of the instant invention.

U.S. Pat. No. 2,376,420 (Davis), discloses a safe protection device. In the Davis patent, if the door is jimmied, the switch will close and an alarm will sound. FIG. 3 of the Davis patent discloses the use of more than one switch in its circuit. However, the structure of the instant invention is not disclosed.

U.S. Pat. No. 937,941 (Jacobson), discloses another device in which rotation of a combination lock will sound an alarm. This device discloses the use of a relay for actuating an alarm circuit when the dial on the safe is turned. Again, the applicant's structure is not disclosed.

U.S. Pat. No. 127,165 (Hoffman), discloses a device for a padlock-secured door in which any unauthorized opening of the door will sound an alarm. The safe is disclosed as forming part of an electrical circuit and that either the opening of the door to the safe or the removal of the safe from its proper position will break the electric circuit and sound the alarm. Again the structure of the instant invention is not disclosed.

U.S. Pat. No. 4,160,137 merely discloses a patented lock switch. It should be noted that the shackle 37 does not interfere with the operation of the handle 14 on the circuit breaker 20.

Finally, the idea of enclosing an entire locking mechanism, specifically a padlock, is known in the art but none of the prior art known to the applicant reveals the unique structure of the present invention.

Accordingly, the structure of the applicant's invention is neither suggested or disclosed. None of the above cited prior art reveals the method or structure of the applicant's unique invention.

It is the primary objective of this invention to provide an improved method of securing small objects such as keys which allows ready access by authorized users, while allowing at least two methods of alarm actuation. Accordingly, the box may be used to store keys or other materials so that those materials may be kept, safely, at a remote location until they are needed.

SUMMARY OF THE INVENTION

The invention is a security box for holding keys or other like important items and consisting essentially of a box made from metal or other suitably strong material having a cover; an electrical circuit containing a plurality of switches capable of actuating an alarm system; at least one padlock; and at least one latching means for securing the cover of the box in a closed position. The latching means is attached to the cover of the box and is capable of actuating at least one of the switches. The padlock being positioned to actuate the latching means.

In addition the following improvements, will be apparent to those skilled in the art once they have read this disclosure. 1. The latching means may be provided with a notched portion so that, the box having a fixed surface in its interior, the notched portion may be engaged with the fixed surface contained within the box only when the padlock is locked; the notch portion engagement with the fixed interior surface preventing the cover of the box from being opened. 2. The addition of a removable plate which prevents access to the sides of the padlock when the plate is in place; the removable plate being secured in place by the cover of the box when the box is closed. Accordingly, the removable plate prevents the padlock from being removed unless the top or cover of the box is open. 3. A padlock having changeable combination may be used. The notched portion of the latching means may be designed to adjoin another cammed portion so as to facilitate the engagement of the latching means with the fixed interior surface of the box. 4. The box may be further modified to include a shoe designed to keep the shackle of the padlock properly aligned with the padlock body so that the padlock may be locked merely by pushing on the exposed bottom of the padlock.

DETAILED DESCRIPTION

Figure 1:
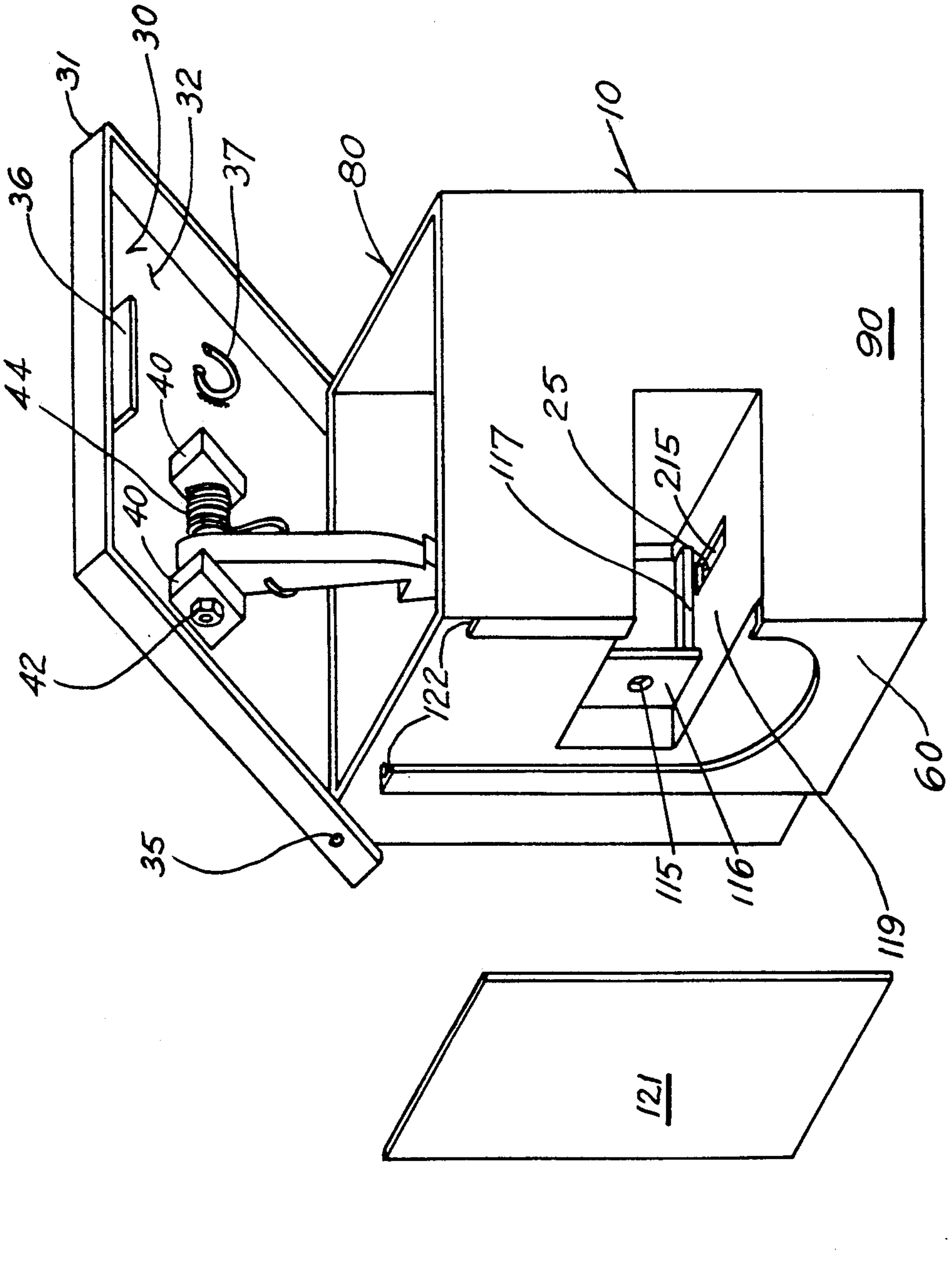
FIG. 1 is a perspective view of the invention.

Although the disclosure detailed hereof is detailed and exact to allow those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention's structure consists of a box which is made of ⅛ inch plate steel for strength and durability; other materials of suitable strength and durability may also be used. For convenience, the security box as a whole will be referred to as the unit 10. The unit 10 is designed to be mounted to a door or a wall through the use of the mounting pads 15. Mounting pads 15 are blocks of metal which are welded to the box back 20. Mounting pads 15 have holes 16 drilled through their centers. Holes 16 allow bolts 17 to be inserted so as to securely attach the unit 10 to a desired surface.

Figure 2:
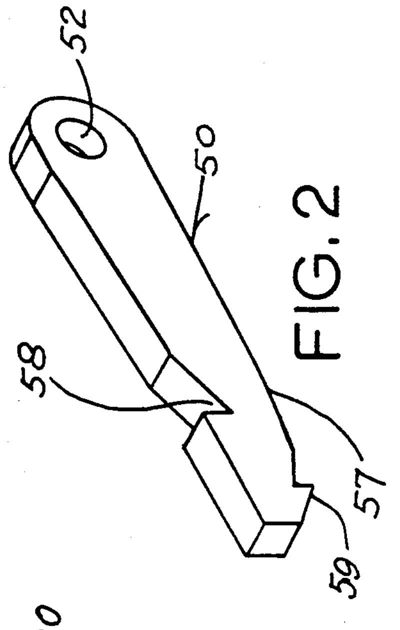
FIG. 2 is a perspective view of the latch bar.
Figure 3:
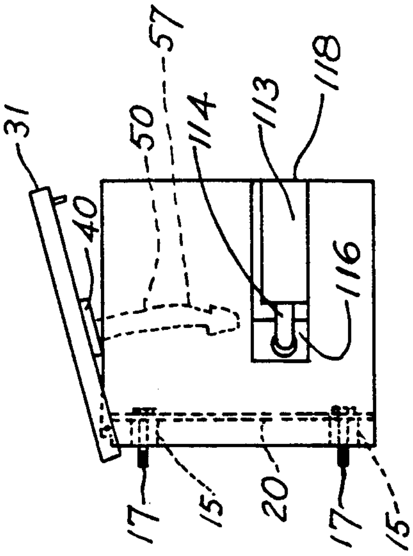
FIG. 3 is a side view of the invention without the metal plate 121 (described below) in place.
Figure 5:
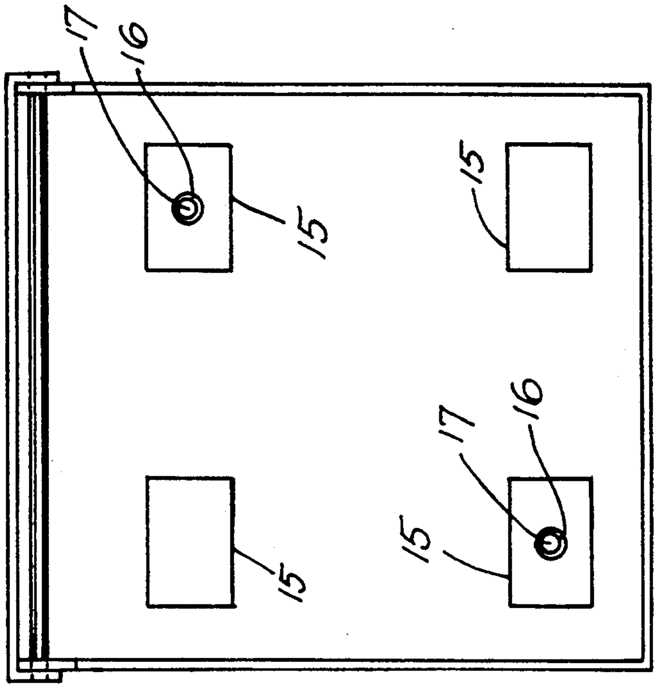
FIG. 5 is a rear view of the present invention.

As shown in FIG. 1, the unit 10 has a cover 30 which is attached to box left side 60 and box right side 80 through the use of hinge 35. Cover 30 has a lip 31 which extends over box back 20, box left side 60, box right side 80, and box front 90. Lip 31 reduces the ability of a thief to insert a prying instrument under the cover 30 and also protects the interior instrument under the cover 30 and also protects the interior structures of the unit 10 by preventing moisture from running into the interior of the unit 10. As disclosed in FIG. 1, tab 36, hook 37, and latch mounting tabs 40 are metal and are welded to the bottom 32 of the cover 30. The hook 37 allows keys or some other item to be conveniently hung in the unit 10. Latch mounting tabs 40 are drilled through their centers so that latch bolt 42 may be inserted through them. Latch bolt 42 is also inserted through latch hole 52 in latch bar 50 as shown in FIG. 2. This method of attaching latch bar 50 to cover bottom 32 allows latch bar 50 to rotate around latch bolt 42. Latch bolt 42 is also inserted through spring 44. Spring 44 biases latch bar 50 toward box front 90.

Still referring to FIG. 1 it may be clearly seen that the latch bolt 42 and the hinge 35 are parallel to each other. This orientation inherently compensates for the arc of travel of the cover 30. Thus the movement of the cover 30 is not is opposition to the movement of the latch bar 50 on the latch bolt 42 but is in concert with that movement. This is preferred because it facilitates the engagement of the notch 58 of the latch bar 50 with the edge 25 of the opening 215 of the unit 10.

Referring to FIGS. 1, 3, 4, and 6, the unit 10 has two switches 111 and 112 for actuating an alarm system 100. Switch 111 interacts with a standard padlock 113 having an adjustable combination. The shackle 114 of the padlock 113 is inserted into an opening 115 in a fixed tab 116. A metal shoe 117 (see FIG. 4) is held in place next to the fixed tab 116. The metal shoe 117 keeps the shackle 114 of the padlock 113 properly aligned so that the padlock 113 may be locked merely by pushing on the bottom 118 of the lock 113. A slot 119 in the unit 10 and the opening 115 in tab 116 are of sufficient size to allow the padlock 113 to be removed from the unit 10 if necessary. A plate 121 slides into grooves 122 on the side 60 of the unit 10. Plate 121 limits access to the padlock 113 because the plate 121 is locked into place by the lip 31 of the cover 30. A latch bar 50 extends through the padlock 113. The end portion 51 of the latch bar 50 contacts the switch 111 which is located in a compartment under the padlock 113. When the padlock 113 is locked, the latch bar 50 is pushed forward by the body of the padlock 113 so as to bring end portion 51 into contact with the switch 111 and close the switch 111 and make the deeply notched surface 58 located above end portion 51 of the latch bar 50 engage the edge 25 of opening 215 (see FIG. 1). The latch bar 50 has a curved, cam like, surface 57 opposite the deeply notched surface 58 (as shown in FIG. 2) which facilitates the engagement of the latching bar 50 with the edge 25 of the opening 215. Because the latch bar 50 is attached to the cover 30, this engagement prevents the cover 30 from opening until the padlock 113 is unlocked and released. The latch bar is spring-loaded so that it disengages from the opening 215 when the lock 113 is opened, thus allowing the cover 30 to be opened.

Figure 8:
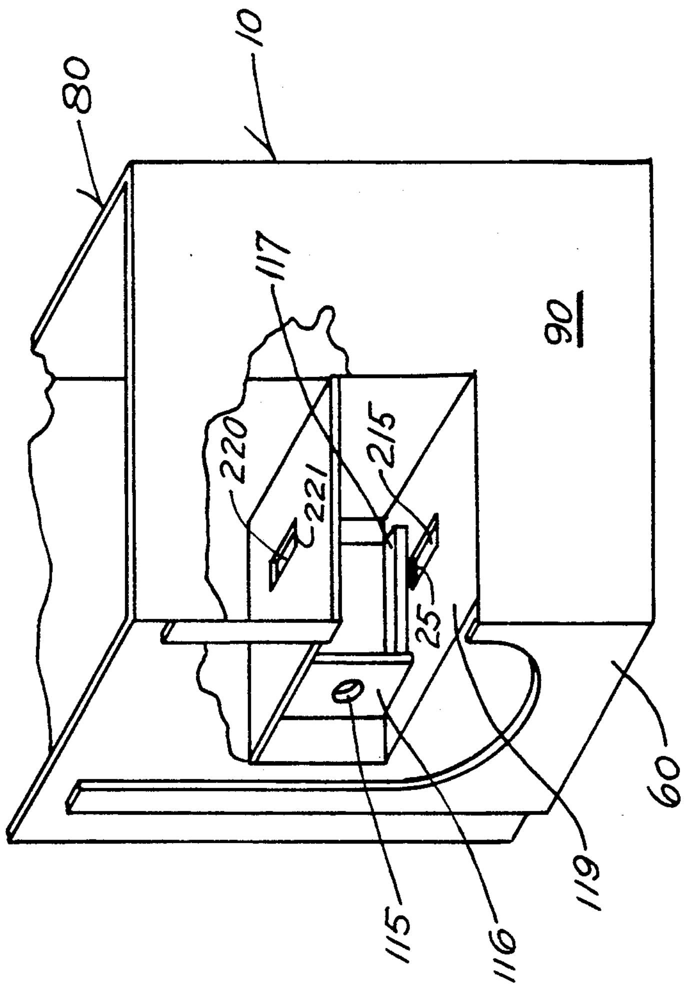
FIG. 8 is a perspective view of the box with the latch removed so that the internal structure of the box may be clearly seen.
Figure 7:
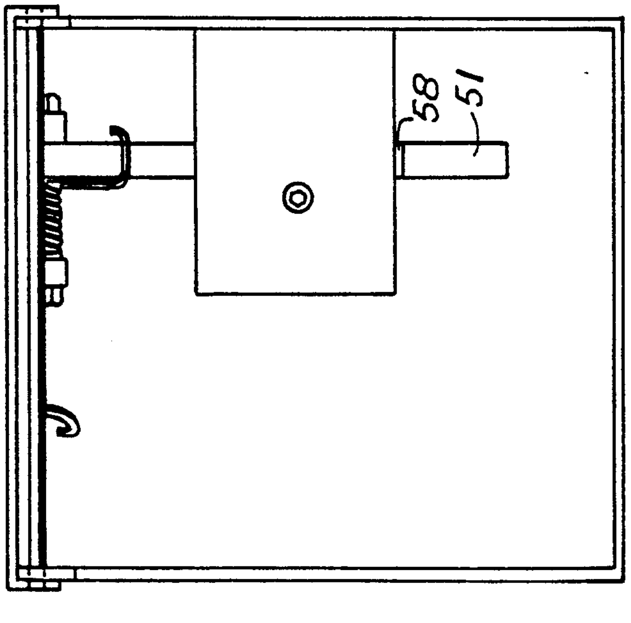
FIG. 7 is a rear view of the present invention with the back plate removed to show the end of the latch bar passed through the latch receiving means of the box.

The cam surface 57 preferrably including a taper to a tooth 59 as shown in FIG. 2. The tooth 59 engaes the edge 221 of the opening 220, disclosed in FIG. 8, when the cover 30 of the unit 10 is lifted or opened. This programs the arc of movement of the cover 30 so that the cover 30 may not be opened beyond a predetermined position and prevents the latch bar 50, biased by the spring 44, from springing up and out of the unit 10 in an uncontrolled manner. Accordingly, the movement of the cover 30 and the latch bar 50 are both controlled by the cam surface 57.

Figure 4:
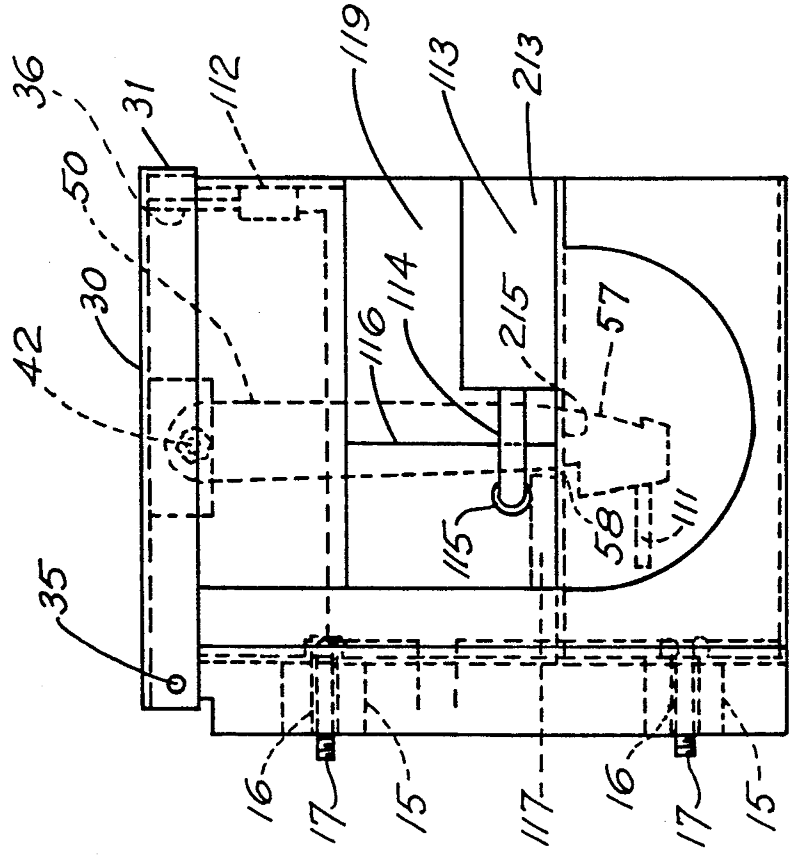
FIG. 4 is a cut away side view of the invention with the lid closed.
Figure 6:
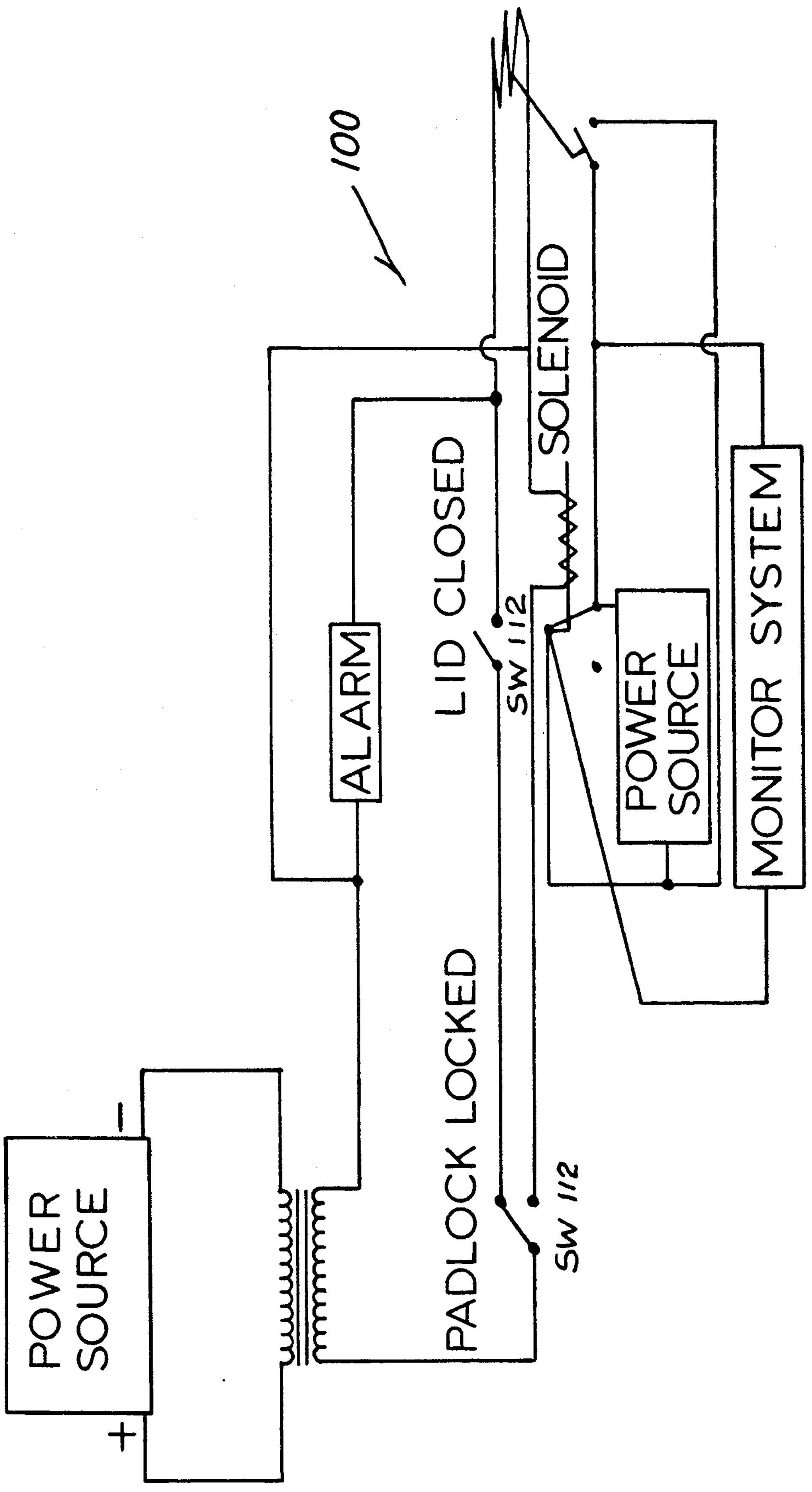
FIG. 6 is a schematic diagram of an alarm circuit which may be used in conjunction with the present invention.

The second switch 112 is actuated by a tab 36 when the cover 30 is closed. Accordingly, if the cover 30 is pried open, the second switch 112 will actuate the alarm circuit 100. The switch 112 may be either normally open or normally closed; switch 112 is illustrated in FIG. 4 as being normally open. The switch 111 is, preferably a single pole double throw switch which normally closes the portion of the alarm circuit 100 connected to the switch 112. If the locking mechanism, the padlock 113, is tampered with, the first switch 111 will actuate the alarm. It is therefore possible to monitor the precise status of the unit 10 through the alarm circuit 100. This helps to prevent the unit 10 from being left unlocked inadvertently. When the alarm circuit 100 is active the cover 30 must be closed and locked; as shown in the figures.

The above described embodiments of this invention are merely descriptive of its principles and are not to be limiting. The scope of this invention instead shall be determined from the scope of the following claims, including their equivalents.

As used in the following claims the term "actuate" shall mean, in addition to its normal meanings, the activation or deactivation of at least one switch. In the event of a contradiction between the normal meanings of the term "actuate" and the additional meaning given above the term shall be interpreted as including all meanings given the term "actuate" and not excluding one meaning or another meaning.

What is claimed is:

1. A security box for mounting against a wall and capable of holding keys, the security box comprising:
- a box having a cover capable of being in alternatively open and closed positions;
- an electrical circuit having a plurality of switches capable of actuating a standard alarm system;
- at least one lock including a shackle and a lock body;
- at least one latching means, having cammed surface opposite a notched surface for securing the cover of the box in the closed position in conjunction with the lock;
- a latch receiving means for receiving the latching means when the cover of the box is in the closed position;
- an opening for receiving and engaging the shackle;
- the latching means being attached to the cover of the box and having spring loaded means for disengaging the latching means from the closed position with the lock;
- the latch receiving means being integral to the box;
- the latching means being capable of actuating at least one of the plurality of switches;
- the lock body of the lock being positioned, when the shackle engages the opening, to contact the cammed surface of the latching means as the latching means engages the latch receiving means so that the latching means actuates at least one of the plurality of switches;
- at least one side of the box having a removable plate;
- the removable plate preventing access to the sides of the lock when the plate is in place;
- the removable plate being secured in place by the cover of the box when the box is closed;
- the removable plate preventing the lock from being removed unless the box is open.

2. The security box of claim 1 in which the latching means has a notched portion;
- the box having a fixed surface in its interior;
- the lock being a padlock;
- the notched portion being engaged with the fixed surface only when the padlock is locked;
- the notched portion engagement preventing the cover of the box from being opened.

3. The security box of claim 1 in which the lock has a changeable combination.

4. The security box of claim 1 further comprising:
- a shoe;
- the lock being a padlock having a padlock body;
- the shoe keeping the shackle of the padlock properly aligned with the padlock body so that the padlock may be locked by pushing on the bottom of the padlock.

5. The security of box of claim 1 in which the cover of the box engages one of the plurality of switches capable of actuating the standard alarm system.

6. A security box consisting of:
- a metal box for mounting against a wall and capable of holding keys, the security box including:
- a box having a cover capable of being in alternatively open and closed positions;
- an electrical circuit having a plurality of switches capable of actuating a standard alarm system;
- at least one lock including a shackle and a lock body;
- at least one latching means, having a cammed surface opposite a notched surface, for securing the cover of the box in the closed position in conjunction with the lock;
- a latch receiving means for receiving the latching means when the cover of the box is in the closed position;
- an opening for receiving and engaging the shackle;
- the latching means being attached to the cover of the box and having spring loaded means for disengaging the latching means from the closed position with the lock;
- the latch receiving means being integral to the box;
- the latching means being capable of actuating at least one of the plurality of switches;
- the lock body of the lock being positioned, when the shackle engages the opening, to contact the cammed surface of the latching means as the latching means engages the latch receiving means so that the latching means actuates at least one of the plurality of switches.

* * * * *